United States Patent
Teramoto

(10) Patent No.: US 6,954,626 B2
(45) Date of Patent: Oct. 11, 2005

(54) HIGH FREQUENCY RECEIVING DEVICE

(75) Inventor: Makoto Teramoto, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 436 days.

(21) Appl. No.: 10/319,627

(22) Filed: Dec. 16, 2002

(65) Prior Publication Data

US 2003/0129953 A1 Jul. 10, 2003

(30) Foreign Application Priority Data

Jan. 10, 2002 (JP) ......................................... 2002-003887

(51) Int. Cl.[7] ................................................ G06F 1/04
(52) U.S. Cl. ....................................... 455/264; 455/260
(58) Field of Search ................................ 455/260–266, 455/259, 84–87, 161.1, 161.2, 101.3, 164.1, 164.2, 343, 197–1, 340, 339, 75–76; 375/344, 350, 376; 324/156–159; 331/2, 14, 16, 17

(56) References Cited

U.S. PATENT DOCUMENTS

| | | | | |
|---|---|---|---|---|
| 4,211,975 A | * | 7/1980 | Kuroda .......................... | 455/75 |
| 4,261,016 A | | 4/1981 | Hongu et al. | |
| 5,511,235 A | | 4/1996 | Duong et al. | |
| 5,686,864 A | * | 11/1997 | Martin et al. ................. | 331/1 A |
| 6,134,282 A | | 10/2000 | Ben-Efraim et al. | |
| 6,512,801 B1 | * | 1/2003 | Ninomiya ..................... | 375/316 |
| 6,647,258 B2 | * | 11/2003 | Nonami ...................... | 455/414.4 |
| 6,707,342 B1 | * | 3/2004 | Zachan et al. ................. | 331/2 |
| 2003/0060177 A1 | * | 3/2003 | Noboru et al. ............... | 455/260 |
| 2003/0206065 A1 | * | 11/2003 | Gomez ......................... | 331/16 |

FOREIGN PATENT DOCUMENTS

| | | |
|---|---|---|
| JP | 8-191231 A | 7/1996 |
| JP | 10-242883 A | 9/1998 |
| JP | 11-298325 A | 10/1999 |

OTHER PUBLICATIONS

"A Fully Integrated Broadband Direct–Conversion Receiver for DBS Applications," Arun. Jayaraman, et al., Conexant Systems Inc., Digital Infotainment Division, San Diego, CA, 2000 IEEE International Solid–State Circuits Conference.

* cited by examiner

Primary Examiner—Pablo N. Tran
(74) Attorney, Agent, or Firm—Birch, Stewart, Kolasch & Birch, LLP

(57) ABSTRACT

A high frequency receiving device in accordance with the present invention includes a local oscillation circuit made up of multiple voltage-controlled oscillators. One of the oscillators is selected by a VCO selecting circuit. An oscillating signal, together with a high-frequency-received signal, is supplied to each mixer circuit. The signal outputs of the mixer circuits are supplied to respective LPFs to produce demodulated signal outputs. The cutoff frequencies of the LPFs are controlled by a cutoff frequency control circuit. A PLL is provided to correct shifts in the oscillation frequency of the voltage-controlled oscillator and intermittently shift in properties of the cutoff frequency control circuit. The circuit is reduced in size, and the signals related to the adjustment of the cutoff frequencies are prevented from undesirably find a path to act as noise on the base-band signal.

28 Claims, 6 Drawing Sheets

HIGH FREQUENCY RECEIVING DEVICE

FIELD OF THE INVENTION

The present invention relates to high frequency receiving devices controlling a local oscillation circuit and a low pass filter laid out on an integrated circuit, in particular, to digital satellite broadcast receiving devices.

BACKGROUND OF THE INVENTION

FIG. 6 is a circuit block diagram showing, as an example, an arrangement of a conventional high frequency receiving device. A high frequency signal received at an antenna 1 is passed through an LNB (Low Noise Block down converter) 2 and a variable gain amplifier circuit 3, frequency-converted into base-band signals by mixer circuits 4, 5, and passed through variable gain amplifier circuits 8, 9. Then, undesirable high frequency components are removed from the signals using low pass filters ("LPFs") 10, 11 respectively. The results are again amplified by the amplifier circuits 13, 14 to produce outputs.

The local oscillating signal fed to the mixer circuits 4, 5 is supplied by a local oscillation circuit 15 (the local oscillating signal fed to the mixer circuit 5 is passed through a phase shifting circuit 6). Here, a phase-locked loop ("PLL") 16 will be described as a circuit which is made up of a typical PLL and communication means which exchanges signals with a controller controlling the PLL. The PLL 16 divides the frequency of the signal output from the local oscillation circuit 15 (oscillating signal from a voltage-controlled oscillation circuit ("VCO oscillating signal")) and compares the result with a signal output from a reference oscillation circuit 19, so as to produce and supply an oscillation frequency control signal to the local oscillation circuit 15. This enables control of the oscillation frequencies of a voltage-controlled oscillation circuit ("VCO") 21 and a VCO 22 in the local oscillation circuit 15. Communication signals between the PLL 16 and the controller 17 carry both oscillation frequency setting information and VCO switching information.

The local oscillation circuit 15, when designed to include multiple VCOs, is preferably arranged to be variable over a wide range of bandwidth with a minimum number of VCO, in view of irregularities in frequencies caused by VCO parameters.

To this end, two VCOs (VCOs 21, 22) are used in the conventional high frequency receiving device, with a switching point (switching frequency) between the VCOs specified approximately to the middle of the reception bandwidth of the receiving device. Further, by specifying the VCO oscillation frequency ranges in such a fashion as to cover the VCO switching point frequency even if the VCO oscillation frequencies shift due to irregularities of components, it is unambiguously determined depending on receiving frequency which of the VCOs becomes active. No particular problem therefore arises as to how to control VCO switching.

Meanwhile, to correct a shift in cutoff frequency due to component irregularities of the LPFs 10, 11, a reference filter circuit 20 is provided which has equivalent properties to the LPFs 10, 11 through which an actual signal is passed. A shift in cutoff frequency is detected making use of the phase properties of the reference filter circuit 20; the cutoff frequency control circuit 12 controls/adjusts the cutoff frequencies of the LPFs 10, 11 based on the result of the detection. This method does not require any particular control of the adjustment action, since the cutoff frequencies are constantly adjusted during reception.

The conventional technique has two major problems. One of them is that the conventional high frequency receiving device needs an oscillation frequency control voltage as high as about 30 V to ensure a wide frequency range with the VCO. Recent electronics increasingly operate on relatively low voltages and would have to accommodate a dedicated power source to provide the 30 V voltage, which could be a factor for undesirable extra cost.

The other problem is that since the LPFs constantly adjust the cutoff frequencies by means of a reference filter circuit, the conventional high frequency receiving device is bulky and current consuming, as well as suffers from a signal from the reference filter circuit which undesirably finds a path and acts as noise on a base-band signal.

SUMMARY OF THE INVENTION

Conceived in view of these conventional problems, the present invention has an object to offer a high frequency receiving device which is manufactured at a low cost because of its reduced circuit size and operation capability on a single voltage level and also which inhibits signals related to cutoff frequency adjustment from undesirably finding a path to act as noise on a base-band signal.

In order to accomplish the object, a high frequency receiving device in accordance with the present invention includes: a local oscillation circuit including multiple voltage-controlled oscillation circuits; a selection circuit which selects one of the voltage-controlled oscillation circuits; frequency conversion circuits each of which receives a local oscillating signal from the local oscillation circuit and a high-frequency-received signal; low pass filter circuits which respectively frequency-convert signal outputs of the frequency conversion circuits to produce demodulated signal outputs; a cutoff frequency control circuit which controls cutoff frequencies of the low pass filter circuits; and a control circuit which controls the voltage-controlled oscillation circuits so as to correct a shift in oscillation frequency of the local oscillating signal, intermittently controls the cutoff frequency control circuit so as to correct a shift in a property of the cutoff frequency control circuit, and controls the selection circuit so as to select one of the voltage-controlled oscillation circuits.

According to the invention, the selection circuit is controlled by the control circuit so as to select one of the multiple voltage-controlled oscillation circuits in the local oscillation circuit. The selected voltage-controlled oscillation circuit supplies a local oscillating signal at its own oscillation frequency to each frequency conversion circuit. A high-frequency-received signal is also supplied to each frequency conversion circuit where the high-frequency-received signal is mixed with the local oscillating signal. Then, the low pass filter circuits frequency-convert the respective signal outputs of the frequency conversion circuits to produce demodulated signal outputs.

When the local oscillation circuit includes two or more voltage-controlled oscillation circuits, each voltage-controlled oscillation circuit develops frequency irregularities due to its parameters, causing shifts in the oscillation frequency.

In light of this, according to the invention, the voltage-controlled oscillation circuits are controlled by the control circuit so that the shifts in the oscillation frequencies of the voltage-controlled oscillation circuits are corrected. In addition, although each voltage-controlled oscillation circuit offers only a small range of variable oscillation frequencies, increasing in number the voltage-controlled oscillation circuits in the local oscillation circuit eliminates the need for a dedicated power source for generating high voltage which was required conventionally as the oscillation frequency control voltage, and the power source voltage for the high frequency receiving device can be also used as the oscillation frequency control voltage. In short, a single level of power source voltage will provide power supply to the entire high frequency receiving device.

The cutoff frequencies of the low pass filter circuits shift due to component irregularities. Conventional techniques detected the shifts in cutoff frequency using phase properties of a reference filter circuit which has equivalent properties to those of the low pass filter circuits and adjusted the low pass filter circuits on the basis of a detected result. However, conventional techniques constantly adjust the shifts in cutoff frequency. The circuit therefore is large in size and consumes a lot of electricity; the signal of the reference filter circuit may undesirably find a path to act as noise on the base-band signal.

In light of these problems, according to the invention, the cutoff frequencies of the low pass filter circuits are controlled by the cutoff frequency control circuit. The cutoff frequency control circuit is intermittently controlled by the control circuit so that shifts in properties of the cutoff frequency control circuit are corrected. Since shifts in properties of the cutoff frequency control circuit are intermittently corrected using functions of the low pass filter circuits in this manner, it is ensured that the cutoff frequency control circuit is reduced in size and power consumption. In addition, no conventional reference filter circuit is necessary any longer; it is thus ensured that the signal from the reference filter circuit is prevented from undesirably finding a path to act as noise on the base-band signal and that cost is reduced.

The control circuit may be arranged to control the selection circuit and the cutoff frequency control circuit independently from each other. In such a case, the selection circuit and the cutoff frequency control circuit are controlled by the control circuit independently from each other. The arrangement ensures that the control circuit performs the control of the two circuits even if the selection circuit makes a selection and the low pass filter circuits performs a cutoff frequency control at different timings.

The control circuit may be arranged to control the selection circuit and the cutoff frequency control circuit concurrently. In such a case, the two circuits are controlled by a single circuit. This ensures that the overall dimensions are reduced accordingly.

The control circuit may be arranged to: include a phase-locked loop circuit which controls the oscillation frequency of the local oscillating signal and a communication circuit which exchanges control information according to which operation of the phase-locked loop circuit is controlled; control the selection circuit and the cutoff frequency control circuit according to the control information; and set the oscillation frequency of the local oscillating signal.

In such a case, the oscillation frequency of the local oscillating signal is controlled by the phase-locked loop circuit. The phase-locked loop circuit operates according to the control information exchanged through the communication circuit. The oscillation frequency setting for the local oscillating signal, the control of the selection circuit, the control of the cutoff frequency control circuit, etc. can be readily done in this manner by means of software, through a control information using a phase-locked loop circuit and a communication circuit. This ensures that there will no increases in circuit size.

The control circuit may be arranged to control the selection circuit according to the oscillation frequency of the local oscillating signal. This is achieved by including information related to the oscillation frequency setting for the local oscillating signal in the control information. In such a case, the inclusion of the information related to the oscillation frequency setting for the local oscillating signal in the control information is achieved by altering software. Therefore, no hardware needs to be provided separately, making the arrangement simple.

The cutoff frequency control circuit may be arranged to automatically control the cutoff frequencies only when the oscillation frequency is set to a reference frequency for adjustment of the cutoff frequencies. In such a case, the number of times the controller performs the control is reduced by making small changes to a logic circuit section in the cutoff frequency control circuit, if there are only a few component irregularities and the cutoff frequencies are controlled infrequently.

The reference frequency may be rendered equal to a frequency of a reference oscillation circuit for the phase-locked loop circuit. In such a case, there is no need to provide a separate frequency for adjustment.

The reference frequency may be arranged to be included in a controllable frequency range of the cutoff frequency control circuit. In such a case, there is no need to separately provide a reference frequency circuit. This makes the arrangement of the circuit simple.

The control circuit may be arranged to control the cutoff frequency control circuit according to the cutoff frequencies of the low pass filter circuits. This is achieved by including information related to the cutoff frequencies of the low pass filter circuits in the control information. In such a case, the inclusion of information related to the cutoff frequencies in the control information is readily achieved by altering software. Therefore, no hardware needs to be provided separately, making the arrangement simple.

The control circuit may be arranged to: include a phase-locked loop circuit which controls the oscillation frequency of the local oscillating signal, a communication circuit which exchanges control information according to which operation of the phase-locked loop circuit is controlled, and a detecting circuit which detects a variation in the oscillation frequency according to information related to an oscillation frequency setting which is part of the control information; and controls the selection circuit and the cutoff frequency control circuit according to an output of the detecting circuit.

In such a case, the oscillation frequency of the local oscillating signal is controlled by the phase-locked loop circuit. The phase-locked loop circuit operates according to the control information exchanged through the communication circuit. Variations in the oscillation frequency, which is part of the control information, are detected by the detecting circuit according to the information related to an oscillation frequency setting. The detecting circuit is obtainable from, for example, a circuit which compares information related to the oscillation frequency setting at a timing with information related to the oscillation frequency setting a unit time before that timing. In this manner, since it is sufficient to provide the detecting circuit having a simple arrangement, there is no need to alter software.

The high frequency receiving device is preferably formed on a semiconductor integrated circuit. In such a case, in comparison to a high frequency receiving device made up of discrete components, the present high frequency receiving device as formed on a semiconductor integrated circuit surely restrains property irregularities and is inexpensive.

The high frequency receiving device is preferably a direct conversion receiving device for use in digital satellite broadcast. In such a case, the high frequency receiving device can have desirable functions required as a direct conversion receiving device for use in digital satellite broadcast.

For a fuller understanding of the nature and advantages of the invention, reference should be made to the ensuing detailed description taken in conjunction with the accompanying drawings.

DESCRIPTION OF THE EMBODIMENTS

Figure 1:
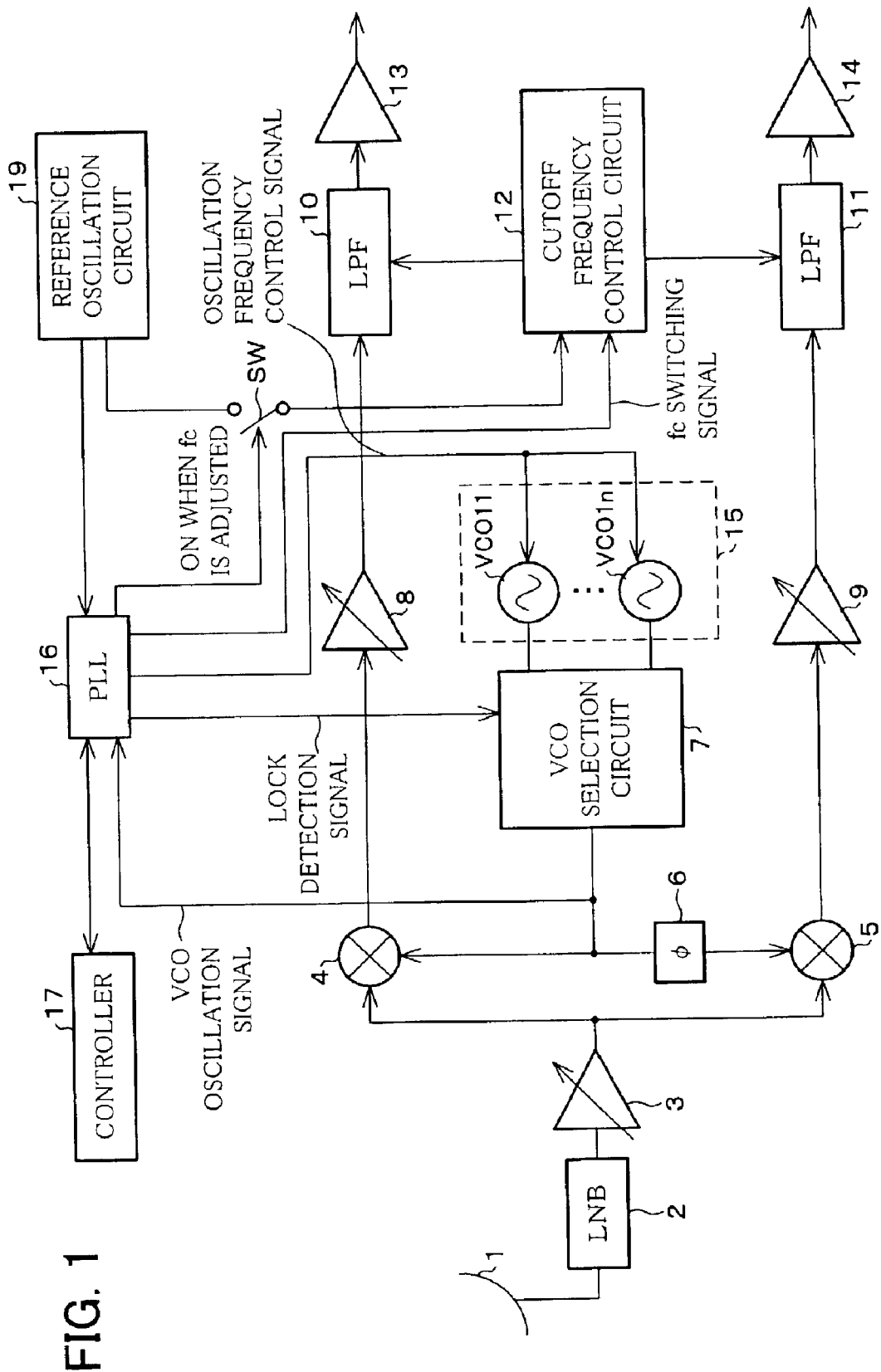
FIG. 1 is a circuit block diagram showing, as an example, an arrangement of a high frequency receiving device in accordance with the present invention.
Figure 4:
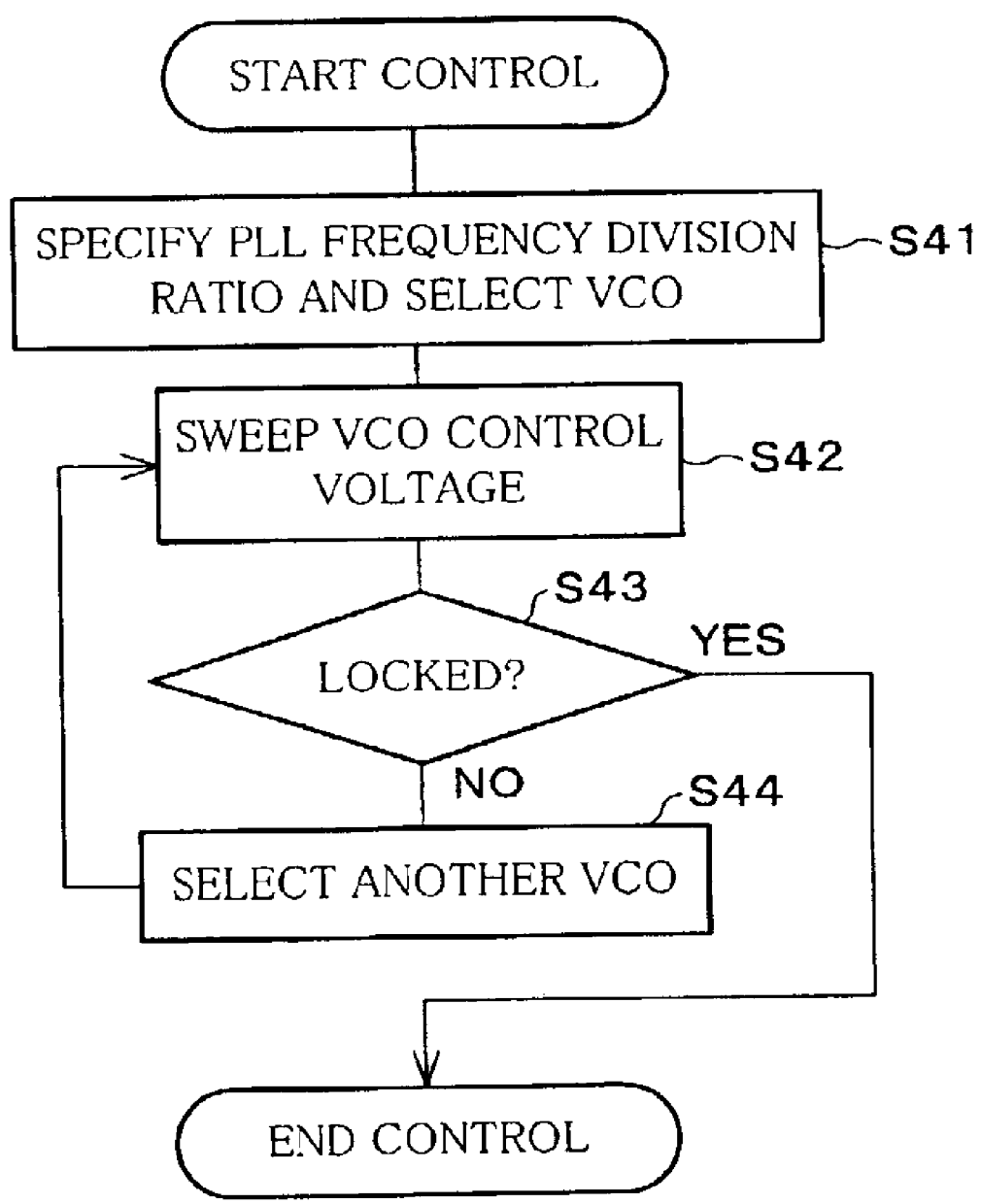
FIG. 4 is a flowchart showing, as an example, control of a VCO selecting circuit in the high frequency receiving device.
Figure 5:
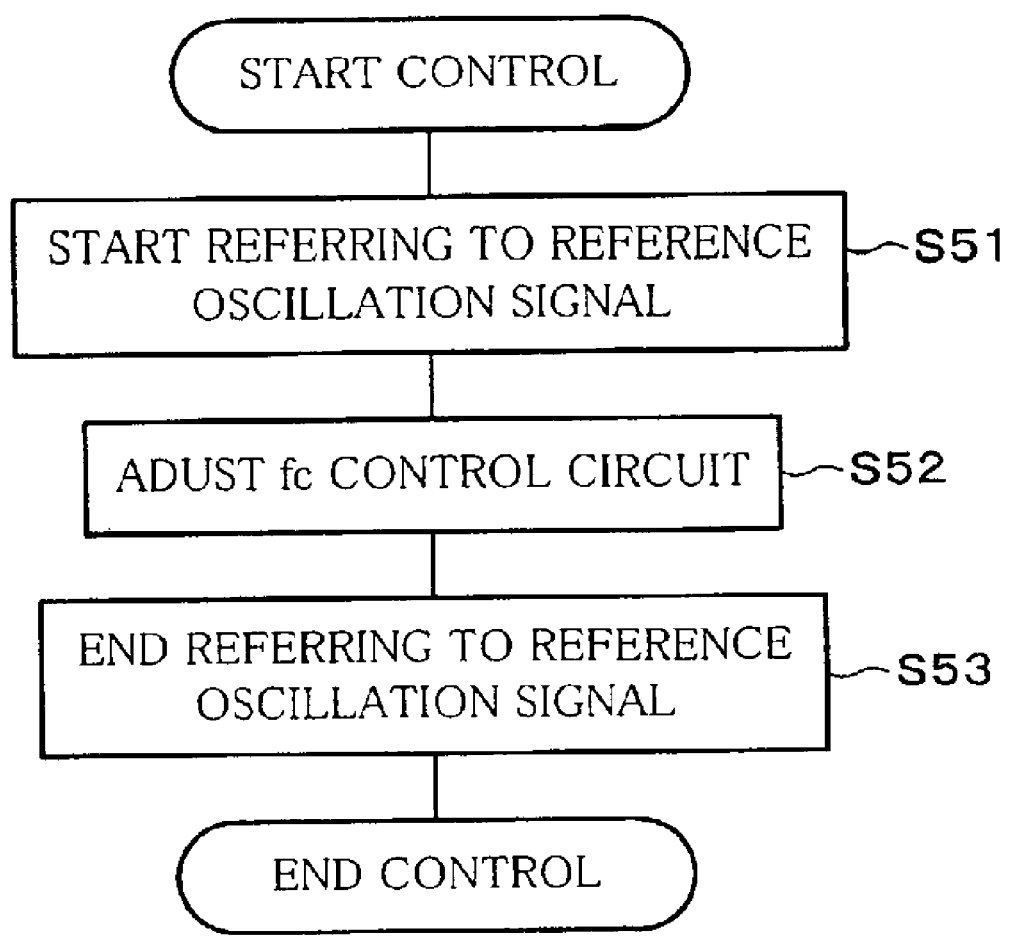
FIG. 5 is a flowchart showing, as an example, control of an LPF cutoff frequency control circuit in the high frequency receiving device.

The following will describe a high frequency receiving device in accordance with the present invention in reference to FIGS. 1, 4, and 5.

Figure 6:
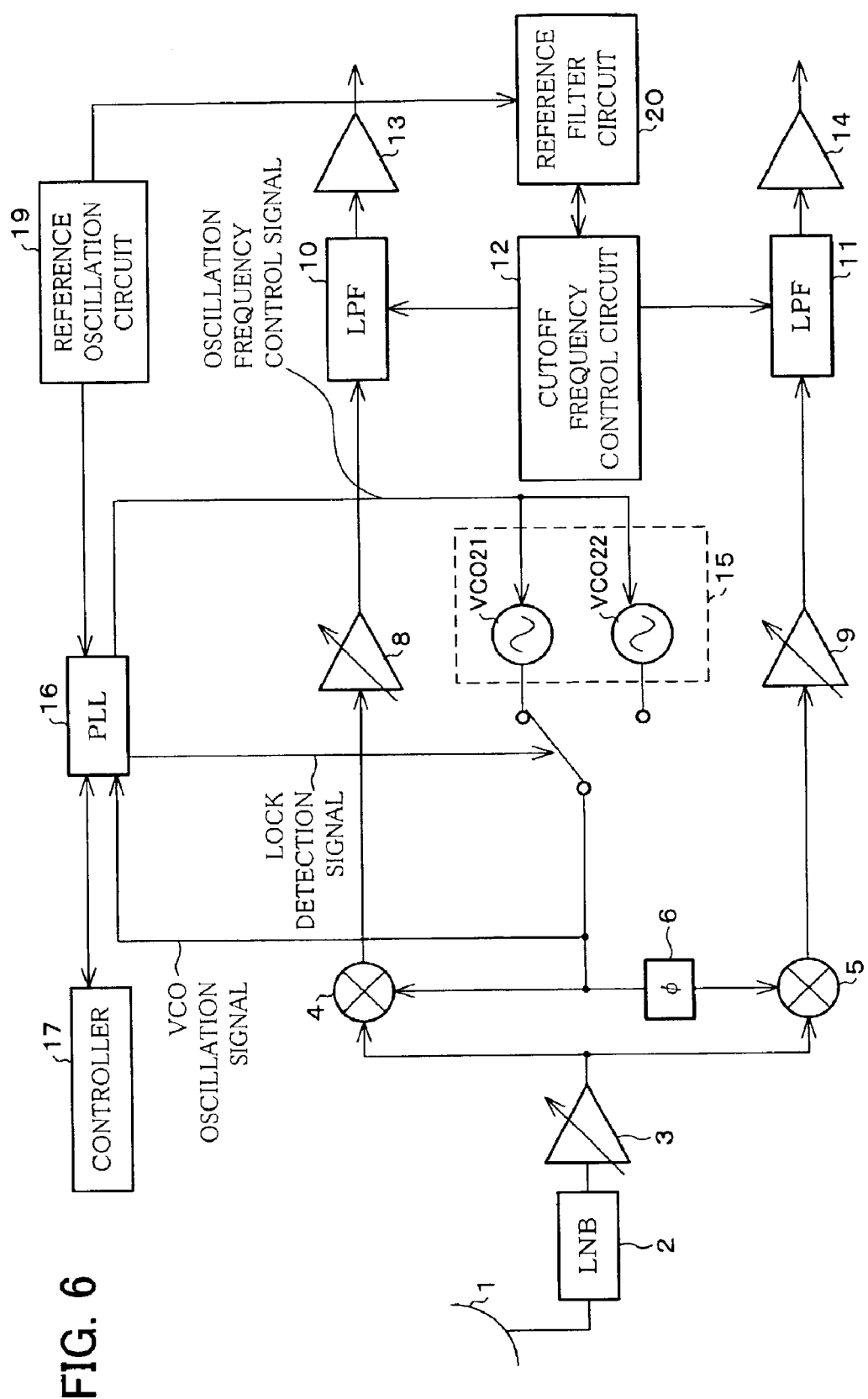
FIG. 6 is a circuit block diagram showing, as an example, an arrangement of a conventional high frequency receiving device.

FIG. 1 is a circuit block diagram showing, as an example, an arrangement of a high frequency receiving device in accordance with the present invention. Circuits in FIG. 1 that have the same function as those in FIG. 6 are indicated by the same reference numerals and detailed description thereof is omitted.

In the present high frequency receiving device, a high frequency signal received at an antenna 1 ("high-frequency-received signal") is passed through an LNB (Low Noise Block down converter) 2 and a variable gain amplifier circuit 3, frequency-converted into base-band signals in mixer circuits 4, 5, and passed through variable gain amplifier circuits 8, 9. Then, undesirable high frequency components are removed from the signals using low pass filters ("LPFs") 10, 11 respectively. The results are again amplified by the amplifier circuits 13, 14 to produce outputs.

The local oscillating signal fed to the mixer circuits 4, 5 (oscillation frequencies of voltage-controlled oscillation circuits ("VCO oscillating signals")) is supplied by a local oscillation circuit 15 (the local oscillating signal fed to the mixer circuit 5 is passed through a phase shifting circuit 6). Here, a phase-locked loop ("PLL") 16 will be described as a circuit which is made up of a typical PLL and communication means (communication circuit) which exchanges signals with a controller 17 controlling the PLL.

The PLL 16 divides the frequency of the signal output from the local oscillation circuit 15 (VCO oscillating signal which is an output signal from a VCO selecting circuit 7) and compares the result with a signal output from a reference oscillation circuit 19, so as to produce and supply an oscillation frequency control signal to the local oscillation circuit 15. This enables control of the oscillation frequencies of VCO 11 to VCO 1n in the local oscillation circuit 15. Communication signals between the PLL 16 and the controller 17 carry at least both oscillation frequency setting information and VCO switching information. The PLL 16 supplies a lock detection signal to the VCO selecting circuit 7.

In the embodiment in accordance with the present invention, the local oscillation circuit 15 is constructed from multiple VCOs (n pieces: VCO 11 to VCO 1n) which oscillate at variable oscillation frequencies within the range of the power source voltage for the high frequency receiving device, so as to reduce cost relative to conventional examples (high frequency receiving devices arranged as in FIG. 6) and provide capability to operate on a single power source.

The controller 17 (i) sets the oscillation frequencies of VCO 11 to VCO 1n, (ii) sets the cutoff frequencies of the LPFs 10, 11, (iii) controls the VCO selecting circuit 7, and (iv) exchanges with the PLL 16 signals carrying information on the control of the cutoff frequency control circuit 12 which controls the cutoff frequencies of the LPFs 10, 11. Control information in (iii) and (iv) refers to information to correct a shift in VCO oscillation frequency due to component irregularities and a shift of a property of the cutoff frequency control circuit 12.

Control information in (i) to (iv) is sent from the controller 17 to the PLL 16 which controls the VCO selecting circuit 7 and the cutoff frequency control circuit 12 according to the information. FIG. 4 is a flowchart showing the way in which the VCO selecting circuit 7 is controlled; FIG. 5 is a flowchart showing the way in which the cutoff frequency control circuit 12 is controlled.

Now, the flowchart in FIG. 4 will be described. As the controller 17 sets the frequency division ratio for the PLL 16 and specifies which of the VCOs to select (S41), the PLL 16 compares the frequency of the signal produced by the division of the VCO oscillating signal with the frequency of the output signal of the reference oscillation circuit 19, and sweeps the VCO control voltage so as to render the frequencies equal to each other (S42). It is determined from a result of the sweep whether the frequencies are equal, that is, whether the loop is locked (S43). If it is determined that the loop is locked, the PLL 16 supplies the lock detection signal to the VCO selecting circuit 7, which completes the control of the VCO selecting circuit 7. Meanwhile, if it is determined that the loop is not locked, another VCO is selected (S44). The operation then proceeds to S42 where the sweep is performed again. The process is repeated until the loop is locked.

The PLL 16 is preferably arranged so as to control the VCO selecting circuit 7 according to the oscillation frequency of the oscillation frequency control signal. When this is the case, the VCO selecting circuit 7 automatically performs the selection when the VCO oscillation frequency setting is changed. This is achieved by including, in the control information, information on the oscillation frequency setting of the oscillation frequency control signal. The inclusion in the control information of information on the oscillation frequency setting of the oscillation frequency control signal is readily achieved by altering software. Therefore, no hardware needs to be provided separately, making the arrangement of the high frequency receiving device simple.

As described in the foregoing, the VCO selecting circuit 7 is controlled by the PLL 16, and one of the VCOs, that is, VCO 11 to VCO in, in the local oscillation circuit 15 is selected. The selected voltage-controlled oscillation circuit provides a VCO oscillating signal (local oscillating signal) which oscillates at its oscillation frequency to the mixer circuits 4, 5 (frequency conversion circuits). A high-frequency-received signal is fed through the LNB2 and the variable gain amplifier circuit 3 to the mixer circuits 4, 5 where the high-frequency-received signal is mixed with the VCO oscillating signal. The output signals of the mixer circuits 4, 5 are frequency-converted by the LPFs 10, 11 and output via the amplifier circuits 13, 14 as demodulated signals.

Conventionally, if two or more VCOs are used in a local oscillation circuit, VCO parameters cause frequency irregularities; as a result, VCO oscillation frequencies shift from desired values.

According to the embodiment, the PLL 16 controls the VCO 11 to VCO in to correct the shifts in the oscillation frequencies of VCO 11 to VCO 1n. In addition, the increased number of the VCO 11 to VCO in 1n the local oscillation circuit 15, although limiting the range in which the oscillation frequencies of the VCO 11 to VCO 1n are variable, renders unnecessary a dedicated power source required conventionally to generate a high voltage as an oscillation frequency control voltage (for example, about 30-V voltage). Hence, the embodiment is adaptable to a recent trend toward progressively reduced power source voltages and capable of using the single power source voltage for the high frequency receiving device and as the oscillation frequency control voltage. In other words, the embodiment enables the high frequency receiving device to operate on a single power source voltage.

Now, the flowchart in FIG. 5 will be described. When the cutoff frequency control circuit 12 is to adjust a property (adjust the cutoff frequencies (fc) of the LPFs 10, 11), the output signal (reference oscillating signal) of the reference oscillation circuit 19 is supplied to the cutoff frequency control circuit 12 via a switch SW (see FIG. 1). The cutoff frequency control circuit 12 starts referring to the output signal of the reference oscillation circuit 19 (S51) and adjusts the cutoff frequencies (fc) according to the cutoff frequency switching signal (fc switching signal) (S52). After the adjustment, the PLL 16 controls the switch SW so as to open it, thereby halting the output signal supply from the reference oscillation circuit 19 to the cutoff frequency control circuit 12. This completes the referring by the cutoff frequency control circuit 12 to the reference oscillating signal (S53).

A shift in a property of the cutoff frequency control circuit 12 is corrected in this manner, by adjusting the property intermittently by means of the switch SW. In other words, a shift in a property of the cutoff frequency control circuit 12 (a shift in cutoff frequency of the LPFs 10, 11) is corrected intermittently by means of the LPFs 10, 11. It is therefore ensured that the cutoff frequency control circuit 12 has reduced circuit size and current consumption. In this manner, in fact, a shift in cutoff frequency due to component irregularities does not need to be constantly corrected; only intermittent corrections are needed.

In addition, the conventionally required reference filter circuit is no longer necessary (see the reference filter circuit 20 in FIG. 6, for example). The omission of the filter circuit ensures that no signal from the reference filter circuit undesirably finds a path to act as noise on a base-band signal and cost is reduced. The control related to the adjustment of a property of the cutoff frequency control circuit 12 is done in such a short time that the control does not affect the operation.

The cutoff frequency control circuit 12 may be arranged so as to automatically perform the control only when the oscillation frequency is set to the reference frequency according to which the cutoff frequencies are adjusted. When this is the case, the number of times the controller performs the control is reduced by making small changes to a logic circuit section (not shown) in the cutoff frequency control circuit 12, if there are only a few component irregularities and the cutoff frequencies are controlled infrequently.

The reference frequency may be equal to the frequency of the reference oscillation circuit 19 for the PLL 16, in which case there is no need to provide a separate frequency for adjustment.

The reference frequency may be included in the controllable frequency range of the cutoff frequency control circuit 12, in which case there is no need to separately provide a dedicated reference frequency circuit. This makes the arrangement of the circuit simple.

The PLL 16 is preferably arranged so as to control the cutoff frequency control circuit according to the cutoff frequency (fc) of the LPFs 10, 11, in which case the cutoff frequency control circuit 12 automatically performs the control when the cutoff frequency settings change. This is achieved by including, in the control information, information on the cutoff frequencies of the LPFs 10, 11. In such an event, the including in the control information of information on the cutoff frequencies is readily achieved by altering software. Therefore, no hardware needs to be provided separately, which surely makes the arrangement simple.

In the case of the arrangement of the FIG. 1, the VCO selecting circuit 7 and the cutoff frequency control circuit 12 are controlled independently as in the foregoing. In such a case, the VCO selecting circuit 7 and the cutoff frequency control circuit 12 are independently controlled by the PLL 16. This surely enables the PLL 16 to control both circuits even if the VCO selecting circuit 7 makes a selection at a different time from when the cutoff frequencies of the LPFs 10, 11 are controlled.

Next, another arrangement of a high frequency receiving device in accordance with the present invention will be described as an example in reference to FIG. 2. Circuits in FIG. 2 that have the same function as those in FIG. 1 are indicated by the same reference numerals and detailed description thereof is omitted.

In this arrangement example, the PLL 16 is controls both the VCO selecting circuit 7 and the cutoff frequency control circuit 12 concurrently according to the information (iii) and (iv). This is what makes the present arrangement differ from the arrangement shown in FIG. 1. The cutoff frequency control circuit 12 is controlled via the switch SW according to the output signal of the reference oscillation circuit 19.

In such a case, since the PLL 16 can control the VCO selecting circuit 7 and the cutoff frequency control circuit 12 concurrently, the circuit can be surely reduced in size.

Next, another arrangement example of the high frequency receiving device in accordance with the present invention will be described in reference to FIG. 3. Circuits in FIG. 3 that have the same function as those in FIG. 1 are indicated by the same reference numerals and detailed description thereof is omitted.

In the present arrangement example, the controller 17 sends to the PLL 16 only that control information which is related to (i) and (ii) ((i) the oscillation frequency setting of VCO 11 to VCO 1n, and (ii) the cutoff frequency settings of the LPFs 10, 11): an oscillation frequency variation detecting circuit 18 is for detecting information related to (i) in an internal signal of the PLL 16 and concurrently controlling the VCO selecting circuit 7 and the cutoff frequency control circuit 12 if there is a change in information (i). These are what makes the present arrangement differ from the arrangement shown in FIG. 2.

Figure 3:
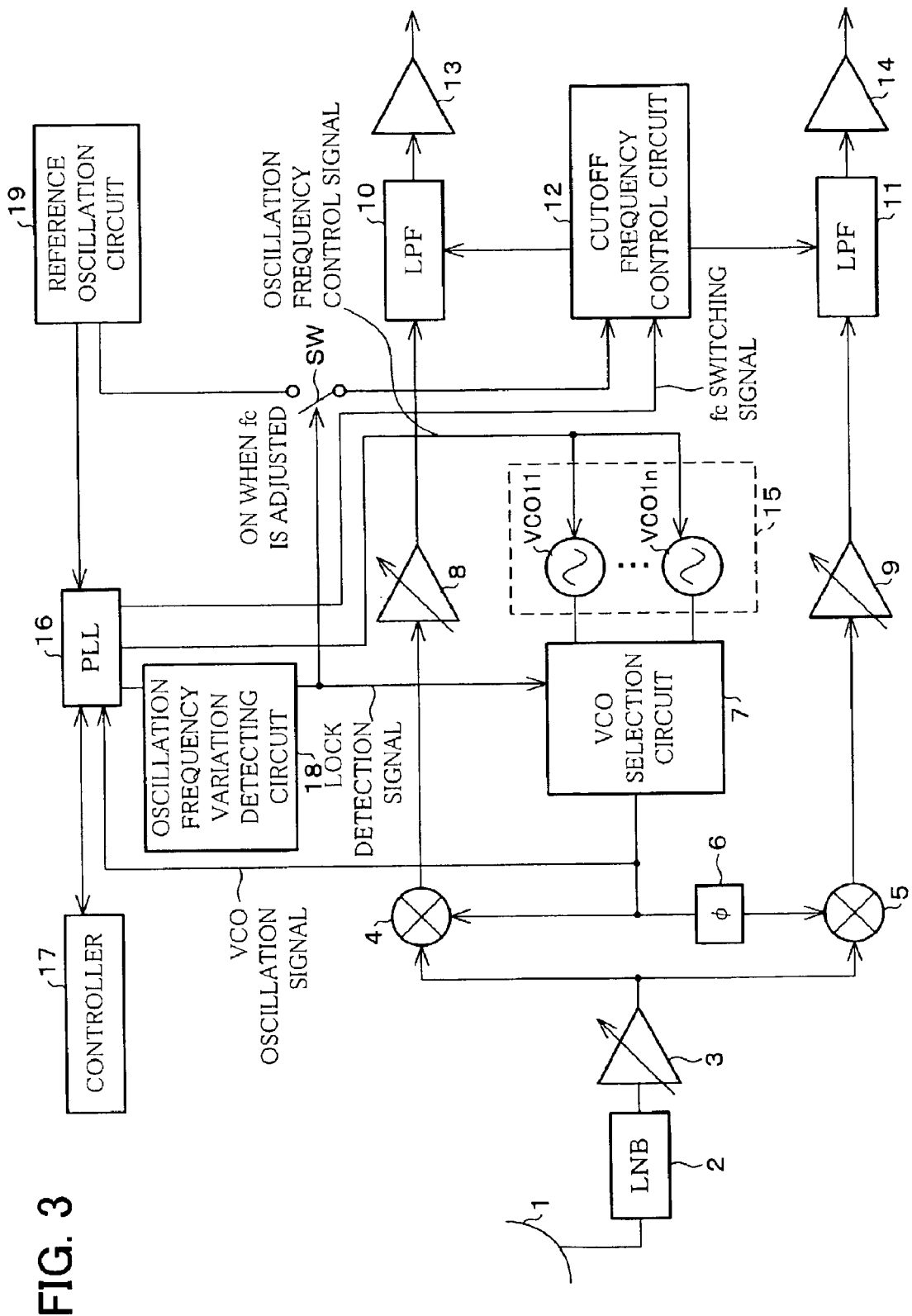
FIG. 3 is a circuit block diagram showing, as an example, a further arrangement of a high frequency receiving device in accordance with the present invention.

In the arrangement example in FIG. 3, the oscillation frequency variation detecting circuit 18 is provided which detects variations in the oscillation frequency according to part of the control information which is related to (i) (information on the oscillation frequency setting), and the VCO selecting circuit 7 and the cutoff frequency control circuit 12 are concurrently controlled according to the output of the oscillation frequency variation detecting circuit 18.

In such a case, the oscillation frequency of the oscillation frequency control signal is controlled by the PLL 16. The PLL 16 operates according to the control information exchanged via a communication circuit. The variations in the oscillation frequency is detected by the oscillation frequency variation detecting circuit 18 according to the information on the oscillation frequency setting which is part of the control information. The oscillation frequency variation detecting circuit 18 is obtainable from, for example, a circuit which compares information related to an oscillation frequency setting at a time with information related to an oscillation frequency setting a unit time before that time. In this manner, in the present arrangement example, since it is sufficient to provide the oscillation frequency variation detecting circuit 18 having a simple arrangement, there is no need to alter software.

Figure 2:
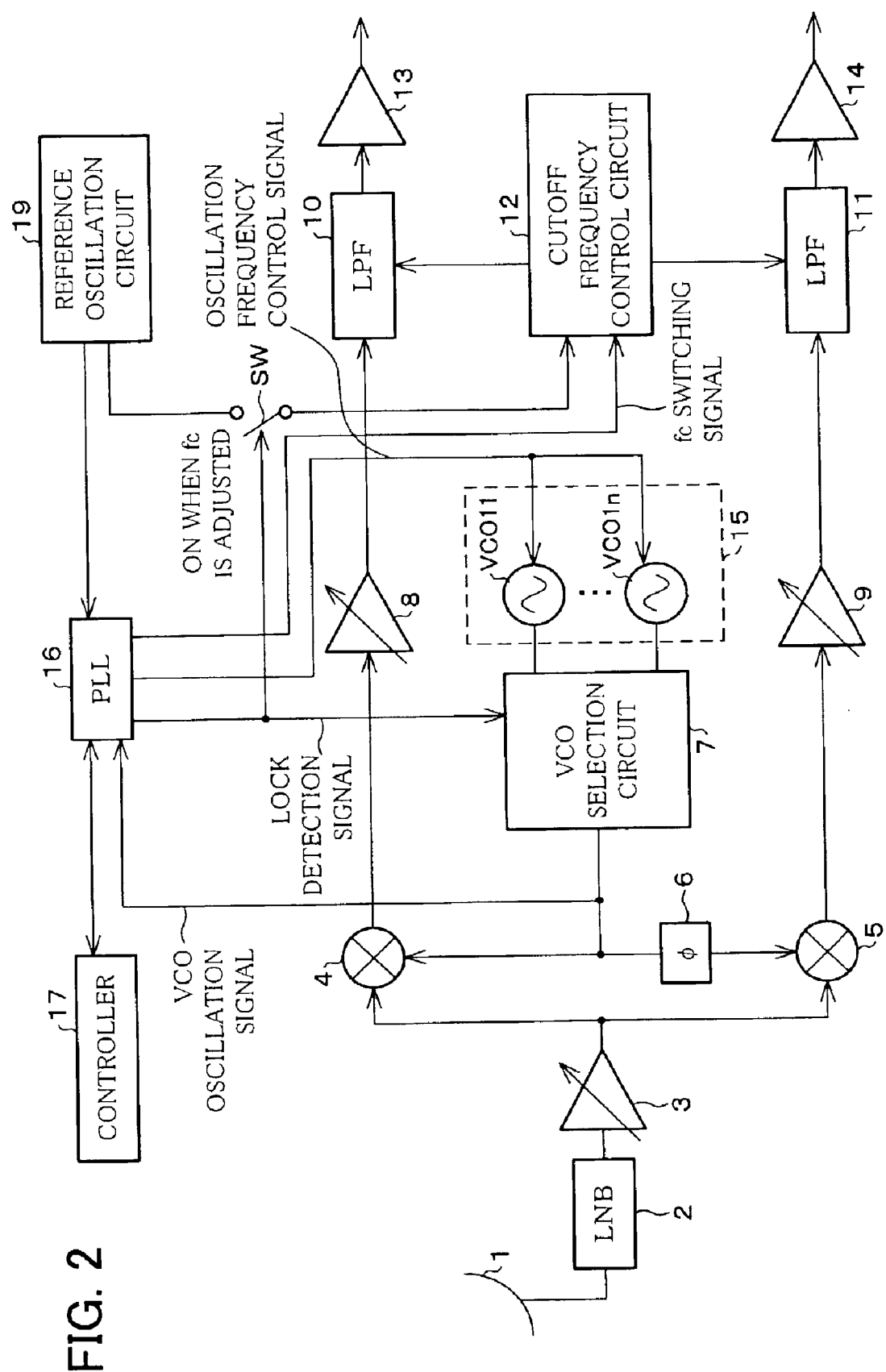
FIG. 2 is a circuit block diagram showing, as an example, another arrangement of a high frequency receiving device in accordance with the present invention.

In the examples in FIGS. 2, 3, the VCO selecting circuit 7 and the cutoff frequency control circuit 12 are again controlled in such a short time that the controlling action does not affect operation. It is therefore ensured that operation current for the VCO selecting circuit 7 and the cut-off control circuit 12 is reduced except when the control action is being performed. Further, since the reference filter circuit used in conventional high frequency receiving devices is no longer necessary (see the reference filter circuit 20 in FIG. 6), the signal of the reference filter circuit undesirably finds a path to act as noise on a base-band signal.

The high frequency receiving device described in the present embodiment is preferably formed on a semiconductor integrated circuit (not shown). In comparison to a high frequency receiving device made up of discrete components, the present high frequency receiving device as formed on the semiconductor integrated circuit surely restrains property irregularities and is inexpensive.

The high frequency receiving device is preferably a direct conversion receiving device for use in digital satellite broadcast. In such a case, the high frequency receiving device can have desirable functions required as a direct conversion receiving device for use in digital satellite broadcast.

As described in the foregoing, a first high frequency receiving device in accordance with the present invention includes: a local oscillation circuit which includes VCO selection means selecting one of multiple VCOs; mixer circuits each of which receives a local oscillating signal from the local oscillation circuit and a high-frequency-received signal; LPFs which respectively selects a desirable converted output signal from output signals of the mixer circuits; and cutoff frequency control means which controls cutoff frequencies of the LPFs, and has such an arrangement to obtain stable and high quality demodulated signals from a high-frequency-received signal.

By so doing, a VCO can be selected which oscillates at a desired oscillation frequency even if component irregularities cause a shift in the VCO oscillation frequency. Similarly, shifts in cutoff frequency of the LPFs, if any, can be adjusted.

As described in the foregoing, a second high frequency receiving device in accordance with the present invention have such an arrangement that in the first high frequency receiving device, the high frequency receiving device controls the VCO selection means and the cutoff frequency control means independently from each other in response to a request from a controller.

By so doing, the selection of the VCO and the control of the cutoff frequency control means can be performed even if the VCO selection and the LPF cutoff frequency control are done at different timings.

As described in the foregoing, a third high frequency receiving device in accordance with the present invention has such an arrangement that in the first high frequency receiving device, the VCO selection means and the cutoff frequency control means are controlled concurrently in response to a request from a controller. By so doing, a common control circuit can control both means, and circuit size can be reduced.

As described in the foregoing, a fourth high frequency receiving device in accordance with the present invention has such an arrangement that in either the first or second high frequency receiving device, there are provided a PLL which controls a VCO oscillation frequency of the local oscillation circuit and communication means which exchanges PLL controlling signals with the controller, and the controller controls the VCO selection means and the cutoff frequency control means independently from each other by adding a dedicated control signal on a communication signal with the PLL using the communication means.

The use of the PLL and the communication means enables the controller to set the VCO oscillation frequency and the LPF cutoff frequencies and control the VCO selection means and the cutoff frequency control means simply by means of software.

As described in the foregoing, a fifth high frequency receiving device in accordance with the present invention has such an arrangement that in the fourth high frequency receiving device, the VCO selection means automatically performs the selection if the VCO oscillation frequency setting is changed.

This is achieved by causing controller software to send VCO selection means control information together with VCO oscillation frequency setting information and arranging to exchanging, as independent signal information with the PLL, three items: the VCO oscillation frequency setting, the cutoff frequency settings, and the control of the cutoff frequency control means. The arrangement has an advantage that it can be achieved with no additional circuit, but only by changes of software.

As described in the foregoing, a sixth high frequency receiving device in accordance with the present invention has such an arrangement that in the fourth high frequency receiving device, the cutoff frequency control means automatically controls the cutoff frequencies if the cutoff frequency settings are changed.

This is achieved by causing controller software to send information on the control of the cutoff frequency control means together with cutoff frequency setting information and arranging to exchange, as independent signal information with the PLL, three items: the VCO oscillation frequency setting, the cutoff frequency settings, and the control of the VCO selection means. The arrangement has an advantage that it can be achieved with no additional circuit, but only with changes in software.

As described in the foregoing, a seventh high frequency receiving device in accordance with the present invention has such an arrangement that in either the first or third high frequency receiving device, there are provided a PLL which controls the VCO oscillation frequency of the local oscillation circuit and communication means which exchanges PLL controlling signals with the controller, and the controller controls the VCO selection means and the cutoff frequency control means concurrently by adding a dedicated control signal on a communication signal with the PLL using the communication means.

As described in the foregoing, an eighth high frequency receiving device in accordance with the present invention has such an arrangement that in the seventh high frequency receiving device, there are provided a PLL which controls the VCO oscillation frequency of the local oscillation circuit and detection means which detects variations in a VCO oscillation frequency setting signal in the communication signal exchanged between the controller and the PLL, and the VCO selection means and the cutoff frequency control means are concurrently controlled depending on the state of the detection means.

The detection means is obtainable by the addition of a circuit which compares, in the PLL, VCO oscillation frequency setting information at a timing with VCO oscillation frequency setting information a unit time before that timing. The arrangement has an advantage that it can be achieved with no change in software, but only with addition of a circuit.

As described in the foregoing, a ninth high frequency receiving device in accordance with the present invention is any one of the first to eighth high frequency receiving devices formed on a semiconductor integrated circuit.

In comparison to a high frequency receiving device arranged from discrete components, the high frequency receiving device as formed on the semiconductor integrated circuit in this manner is advantageous in that it restrains properties irregularities and is inexpensive.

As described in the foregoing, the ninth high frequency receiving device is preferably a direct conversion receiving device for use in digital satellite broadcast.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A high frequency receiving device, comprising:
   a local oscillation circuit including multiple voltage-controlled oscillation circuits;
   a selection circuit which selects one of the voltage-controlled oscillation circuits;
   frequency conversion circuits each of which receives a local oscillating signal from the local oscillation circuit and a high-frequency-received signal;
   low pass filter circuits which respectively frequency-convert signal outputs of the frequency conversion circuits to produce demodulated signal outputs;
   a cutoff frequency control circuit which controls cutoff frequencies of the low pass filter circuits; and
   a control circuit which controls the voltage-controlled oscillation circuits so as to correct a shift in oscillation frequency of the local oscillating signal, intermittently controls the cutoff frequency control circuit so as to correct a shift in a property of the cutoff frequency control circuit, and controls the selection circuit so as to select one of the voltage-controlled oscillation circuits.

2. The high frequency receiving device as set forth in claim 1, wherein
   the control circuit controls the selection circuit and the cutoff frequency control circuit independently from each other.

3. The high frequency receiving device as set forth in claim 1, wherein
   the control circuit controls the selection circuit and the cutoff frequency control circuit concurrently.

4. The high frequency receiving device as set forth in claim 1, wherein
   the control circuit: includes a phase-locked loop circuit which controls the oscillation frequency of the local oscillating signal and a communication circuit which exchanges control information according to which operation of the phase-locked loop circuit is controlled; controls the selection circuit and the cutoff frequency control circuit according to the control information; and sets the oscillation frequency of the local oscillating signal.

5. The high frequency receiving device as set forth in claim 2, wherein
   the control circuit: includes a phase-locked loop circuit which controls the oscillation frequency of the local oscillating signal and a communication circuit which exchanges control information according to which operation of the phase-locked loop circuit is controlled; controls the selection circuit and the cutoff frequency control circuit according to the control information; and sets the oscillation frequency of the local oscillating signal.

6. The high frequency receiving device as set forth in claim 3, wherein
   the control circuit: includes a phase-locked loop circuit which controls the oscillation frequency of the local oscillating signal and a communication circuit which exchanges control information according to which operation of the phase-locked loop circuit is controlled; controls the selection circuit and the cutoff frequency control circuit according to the control information; and sets the oscillation frequency of the local oscillating signal.

7. The high frequency receiving device as set forth in claim 4, wherein
   the control circuit controls the selection circuit according to the oscillation frequency of the local oscillating signal.

8. The high frequency receiving device as set forth in claim 5, wherein
   the control circuit controls the selection circuit according to the oscillation frequency of the local oscillating signal.

9. The high frequency receiving device as set forth in claim 6, wherein
   the control circuit controls the selection circuit according to the oscillation frequency of the local oscillating signal.

10. The high frequency receiving device as set forth in claim 4, wherein
the control circuit controls the cutoff frequency control circuit according to the cutoff frequencies of the low pass filter circuits.

11. The high frequency receiving device as set forth in claim 5, wherein
the control circuit controls the cutoff frequency control circuit according to the cutoff frequencies of the low pass filter circuits.

12. The high frequency receiving device as set forth in claim 6, wherein
the control circuit controls the cutoff frequency control circuit according to the cutoff frequencies of the low pass filter circuits.

13. The high frequency receiving device as set forth in claim 10, wherein
the cutoff frequency control circuit automatically controls the cutoff frequencies only when the oscillation frequency is set to a reference frequency for adjustment of the cutoff frequencies.

14. The high frequency receiving device as set forth in claim 11, wherein
the cutoff frequency control circuit automatically controls the cutoff frequencies only when the oscillation frequency is set to a reference frequency for adjustment of the cutoff frequencies.

15. The high frequency receiving device as set forth in claim 12, wherein
the cutoff frequency control circuit automatically controls the cutoff frequencies only when the oscillation frequency is set to a reference frequency for adjustment of the cutoff frequencies.

16. The high frequency receiving device as set forth in claim 13, wherein
the reference frequency is equal to a frequency of a reference oscillation circuit for the phase-locked loop circuit.

17. The high frequency receiving device as set forth in claim 14, wherein
the reference frequency is equal to a frequency of a reference oscillation circuit for the phase-locked loop circuit.

18. The high frequency receiving device as set forth in claim 15, wherein
the reference frequency is equal to a frequency of a reference oscillation circuit for the phase-locked loop circuit.

19. The high frequency receiving device as set forth in claim 13, wherein
the reference frequency is included in a controllable frequency range of the cutoff frequency control circuit.

20. The high frequency receiving device as set forth in claim 14, wherein
the reference frequency is included in a controllable frequency range of the cutoff frequency control circuit.

21. The high frequency receiving device as set forth in claim 15, wherein
the reference frequency is included in a controllable frequency range of the cutoff frequency control circuit.

22. The high frequency receiving device as set forth in claim 16, wherein
the reference frequency is included in a controllable frequency range of the cutoff frequency control circuit.

23. The high frequency receiving device as set forth in claim 17, wherein
the reference frequency is included in a controllable frequency range of the cutoff frequency control circuit.

24. The high frequency receiving device as set forth in claim 18, wherein
the reference frequency is included in a controllable frequency range of the cutoff frequency control circuit.

25. The high frequency receiving device as set forth in claim 1, wherein
the control circuit: includes a phase-locked loop circuit which controls the oscillation frequency of the local oscillating signal, a communication circuit which exchanges control information according to which operation of the phase-locked loop circuit is controlled, and a detecting circuit which detects a variation in the oscillation frequency according to information related to an oscillation frequency setting which is part of the control information; and controls the selection circuit and the cutoff frequency control circuit according to an output of the detecting circuit.

26. The high frequency receiving device as set forth in claim 3, wherein
the control circuit: includes a phase-locked loop circuit which controls the oscillation frequency of the local oscillating signal, a communication circuit which exchanges control information according to which operation of the phase-locked loop circuit is controlled, and a detecting circuit which detects a variation in the oscillation frequency according to information related to an oscillation frequency setting which is part of the control information; and controls the selection circuit and the cutoff frequency control circuit according to an output of the detecting circuit.

27. The high frequency receiving device as set forth in claim 1, formed on a semiconductor integrated circuit.

28. The high frequency receiving device as set forth in claim 27, wherein the device is a direct conversion receiving device for use in digital satellite broadcast.

* * * * *